UNITED STATES PATENT OFFICE 2,541,730

PROCESS OF MAKING CORN MEAL PORRIDGE

Crawford J. Walker, Indianapolis, Ind.

No Drawing. Application February 20, 1947, Serial No. 729,881

3 Claims. (Cl. 99—80)

This invention relates to a process for preparing a corn meal product distinct in form from the commonly known "mush," being usable as a porridge. The primary object of the invention is to prepare a cooked corn meal which may be canned and stored for future use neady for serving upon opening and simply by adding water or milk thereto and heating. A further primary object of the invention is to prepare such a product in a manner whereby the product is readily mixable with the water or milk in the absence of lumps or remaining a solid mass such as is the case with the ordinary mush product.

I place a quantity of corn meal, either of the yellow or white variety, in a mixer and cover that quantity with water to a level of from six to eight inches above the level of the meal. The temperature of the water applied is what is ordinarily termed as cold water such as might come directly from a well or from a city water supply, although this temperature may include water at room temperature. In any event the temperature of the water must be below that required to cook the meal.

Now the meal settles to the bottom of the mixer. This mixture of meal and water is agitated for approximately five minutes then the agitation is stopped. As soon as the meal settles, which it will do quickly, the water is noted to be of a starchy color, and in addition to the starch some of the gluten from the meal is also present. This discolored water is drawn off completely and additional cold water is added and agitation is repeated. This agitation, settling of the meal and drawing off of the water is repeated some five times, or at least until the water appears clear.

When the water becomes clear, part of it is drawn off, but enough water is allowed to remain mixed with the meal to permit the wet meal to flow. This wet meal is flowed into a body of water having a temperature of 140° F. One pound of meal is used with from three to four quarts of water in the cooking process. Following an initial period of cooking the meal for five minutes at 140° F. temperature, the mixture is brought up to the boiling temperature and the mass allowed to boil at atmospheric pressure for five minutes.

The mass thus prepared may be handled while still hot or it may be handled at temperatures therebelow, since the process has destroyed the congealing property, as is evident in the ordinary prepared mush where the mass promptly sets into a congealed state much like jelly and defies mixing back into a liquid without having to mash up the mass or the lumps into which the mass may be broken.

Following the boiling period, the cooked meal is poured into a receptacle such as the ordinary metal cans and sealed gas tight. The sealed cans are then placed in any suitable retort or sterilizer where heat through any suitable medium in the presence of pressure above atmospheric is applied to cans for a sufficient length of time to sterilize the contents, such period of time for example, with the use of steam at fifteen pounds pressure is approximately 90 minutes.

The sterilized cans are cooled and are then ready to be distributed to the retail outlets. The purchaser is thus provided with a ready cooked cereal which only requires the opening of the can and the addition thereto of either water or milk as may be desired to reduce the consistency of the mass so as to provide a porridge preferably heated.

The mass in the can does not set or "jelly" and therefore is readily mixable with water or milk without any tendency at all to remain in lumps or congealed masses. By following the process above indicated, the corn meal remains in discrete particles rather than adhering one to the other through the otherwise normally present starch and gluten in the cooking water. Thus it is to be seen that a cooked corn product is provided that is readily dispersed in a fluid such as water or milk without the requirement of having to be agitated or mashed. The same process is usable in connection with "grits" which is only a coarser grind of the ordinary finely ground corn meal.

I claim:

1. The process which comprises the steps of intermittently agitating corn meal in water below cooking temperature for agitating periods of approximately five minutes and allowing the meal to settle between agitating periods; drawing off the water between said periods and continuing those periods until the water becomes clear; flowing the corn meal with a residual clear water content into a body of water at approximately 140 degrees F., and holding that temperature for approximately five minutes; raising the temperature of said body of water with the meal therein to approximately 212 degrees F., and maintaining that temperature for approximately five minutes; and thereafter sealing the cooked wet meal in cans and continuing cooking under pressure for a length of time sufficient to sterilize the mass.

2. The process which comprises the steps of intermittently agitating corn meal in water below cooking temperature for agitating periods of approximately five minutes and allowing the meal to settle between agitating periods; drawing off the water between said periods and continuing those periods until the water becomes clear; flowing the corn meal with a residual clear water content into a body of water at approximately 140 degrees F., and holding that temperature for approximately five minutes; raising the temperature of said body of water with the meal therein to approximately 212 degrees F., and maintaining that temperature for approximately five minutes; and thereafter sealing the cooked wet meal in cans and continuing cooking under pressure for a length of time sufficient to sterilize the mass, the temperature of said water employed during the initial agitating periods being at room temperature or therebelow.

3. The process which comprises the steps of intermittently agitating corn meal in water below cooking temperature for agitating periods of approximately five minutes and allowing the meal to settle between agitating periods; drawing off the water between said periods and continuing those periods until the water becomes clear; flowing the corn meal with a residual clear water content into a body of water at approximately 140 degrees F., and holding that temperature for approximately five minutes; raising the temperature of said body of water with the meal therein to approximately 212 degrees F., and maintaining that temperature for approximately five minutes; and thereafter sealing the cooked wet meal in cans and continuing cooking under pressure for a length of time sufficient to sterilize the mass; the proportion of meal to water at the 140 degree temperature being on the order substantially of one pound of meal to four (4) quarts of water.

CRAWFORD J. WALKER.

REFERENCES CITED

The following references are of record in the file of this patent:

UNITED STATES PATENTS

| Number | Name | Date |
| --- | --- | --- |
| 149,503 | Merrill | Apr. 7, 1874 |
| 476,599 | Bates | June 7, 1892 |
| 776,471 | Jackson | Nov. 29, 1904 |
| 2,310,028 | Gustavson | Feb. 2, 1943 |
| 2,334,665 | Yonan Malek | Nov. 16, 1943 |

OTHER REFERENCES

Lord, Everybody's Cook Book, Henry Holt & Co., N. Y., 1924, pages 190–191.